S. LUCIER.
DETACHABLE HANDLE FOR SAWS.
APPLICATION FILED APR. 7, 1915.

1,145,428.

Patented July 6, 1915.

Witness
H. B. Davis.

Inventor:
Samuel Lucier
by Nugo & Harriman
attys.

UNITED STATES PATENT OFFICE.

SAMUEL LUCIER, OF BOSTON, MASSACHUSETTS.

DETACHABLE HANDLE FOR SAWS.

1,145,428.

Specification of Letters Patent.

Patented July 6, 1915.

Application filed April 7, 1915. Serial No. 19,759.

*To all whom it may concern:*

Be it known that I, SAMUEL LUCIER, a citizen of the United States, residing at Boston, in the county of Suffolk and State of Massachusetts, have invented an Improvement in Detachable Handles for Saws, of which the following is a specification.

This invention relates to detachable handles for saw-blades, and has for its object the construction of improved means for detachably connecting the handle with the blade which admits of the employment of the ordinary handle now in common use, and which may be easily and quickly operated and will act to securely hold the blade in place.

Figure 1:
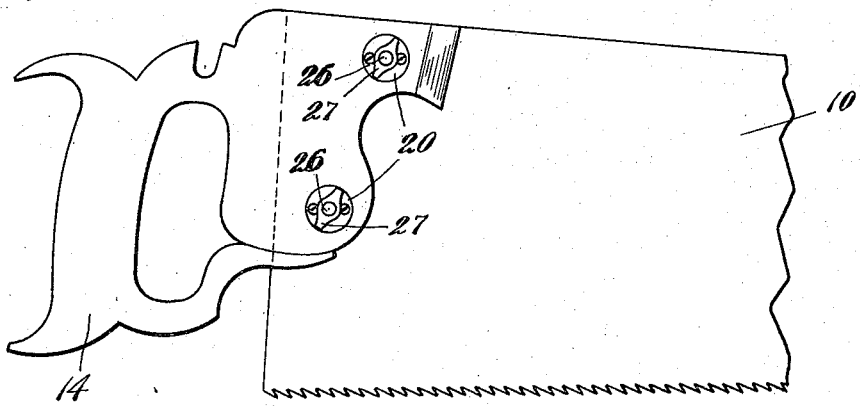
Figure 2:
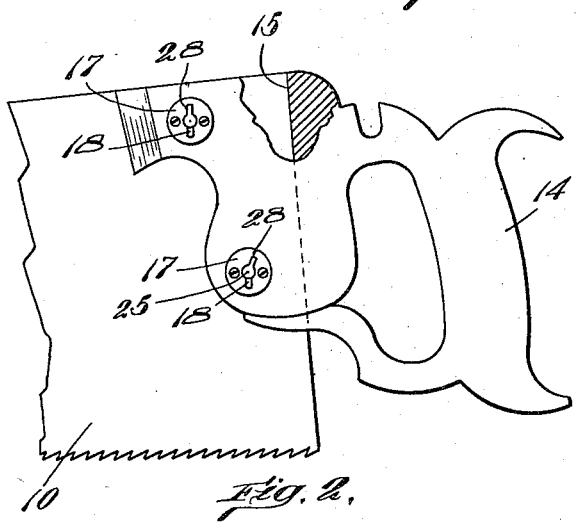
Figure 3:
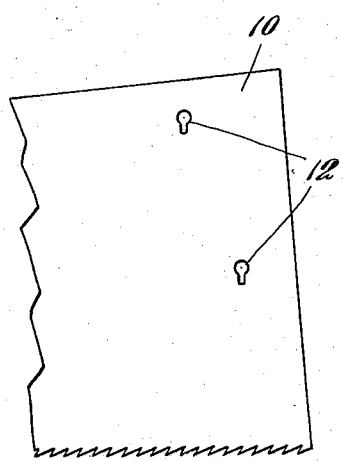
Figure 4:
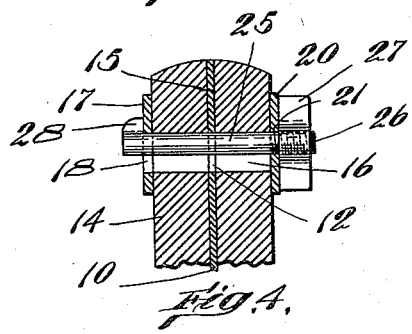
Figure 5:
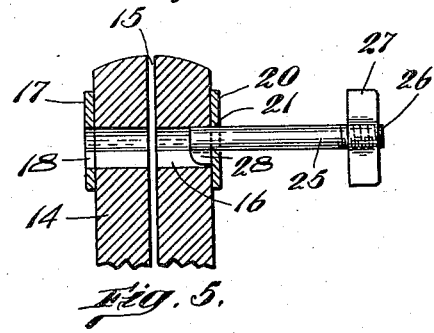

Figure 1 is a front elevation of a detachable handle for saw-blades. Fig. 2 is a rear elevation of the same. Fig. 3 is a fragmentary view of a portion of the saw-blade. Fig. 4 is a transverse vertical section of a portion of the handle taken through one of the securing-bolts, and, Fig. 5 is a similar view, the securing-bolt having been withdrawn.

The saw-blade 10, of usual construction, has several key-hole slots 12 through it, two being here shown. The handle 14 is made as usual, having a narrow recess 15, into which the blade is fitted, the bottom of the recess and the top of the handle being arranged at approximately right-angles to each other to predetermine the relative position of the blade therein. The handle has key-hole slots 16 through it, from side to side, arranged coincident with the slots 12 in the blade, thus to admit of the passage through it and also the blade of key-shaped securing-bolts. On one side of the handle a metallic plate 17, of circular or other form is arranged over the key-hole slot therein, which has a key-hole slot 18, coincident with the key-hole slot in the handle; and on the other side of the handle a metallic plate 20, of circular or other form is arranged over the key-hole slot, which has a circular center-hole 21, through it, arranged opposite the circular portion of the key-hole slot in the handle.

The securing-means consists of a bolt having a cylindrical shank 25, made long enough to extend entirely through the handle and the side-plates thereon including the blade, and having a screw-threaded end-portion 26, projecting beyond one side of the handle to receive upon it a nut 27, which may be of the finger type, and having a lateral projection 28, at the other end which may be formed by bending over and flattening the end-portion of the shank. The shank is made to substantially fit the circular portion of the key-hole slots in the handle and blade, and the lateral projection is made to substantially fit the slotted portion of said key-hole slots. Key-hole slots and securing-bolts having a correspondingly shaped end-portion are employed particularly for ease of construction and manipulation, and it will be understood that slight alterations may be made therein without departing from the spirit and scope of this invention.

In first assembling the parts, a blade is fitted into the recess in the handle, then the cylindrical shanks of the securing-bolts are projected through the key-hole slots and the circular opening in the side-plate 20 until the screw-threaded end-portion projects sufficiently to receive upon it the nut 27, then the lateral projection 28 is turned out of alinement with the slot of the key-hole slot in the side-plate 17, and then the nut is turned up tightly, thereby binding the parts together.

To remove the blade the lateral projection 28 is engaged and held against turning while the nut is being loosened, and when loosened, said projection is turned into alinement with the slot of the key-hole slot, and then the bolt is pulled by the nut in a longitudinal direction, and its cylindrical shank and lateral projection are drawn through the key-hole slots, like unto the withdrawal of a key, until said projection engages the inside of the side-plate 20, see Fig. 5, whereupon the blade may be removed. To subsequently secure the blade, a reversal of these motions is necessary.

It will be observed that the bolt having once associated with the handle will remain associated therewith, either in its engaging or disengaging position; further, that longitudinal movement of the bolt is permitted and is also guided by the key-hole slots in the several parts; further, that the ordinary handle may be employed, the usual circular holes through it for the usual attaching-screws being provided with slots to form the key-hole slots, and the side-plates being secured to the handle over said slots. Furthermore, the thread on the bolt is made long enough to provide for variations in thickness of the handles.

I claim:—

The detachable handle for saw blades having key-hole slots therethrough, and side-plates arranged over each slot, one plate having a key-hole slot, and the other plate having a circular hole in line with the circular portion of the key-hole slot, and securing-bolts, each bolt adapted to be arranged with its shank-portion extended through the circular hole through one of the side-plates, and having a threaded end-portion, and a nut arranged on said threaded portion for engagement with the outer face of said plate, the other end of said bolt having a lateral projection of dimensions corresponding with the slotted portions of the key-hole slots, said bolt with its lateral projection arranged for movement along the key-hole slots of the handle and of the other side-plate, and to be projected through said side-plate and turned out of alining position with the key-hole slot therethrough for engagement with the outer face of said plate.

In testimony whereof, I have signed my name to this specification, in the presence of two subscribing witnesses.

SAMUEL LUCIER.

Witnesses:
  B. J. NOYES,
  H. B. DAVIS.

Copies of this patent may be obtained for five cents each, by addressing the "Commissioner of Patents, Washington, D. C."